United States Patent [19]

Ohmura

[11] Patent Number: 4,485,580
[45] Date of Patent: Dec. 4, 1984

[54] REEL MOUNT ASSEMBLY OF CYLINDRICAL STRUCTURE

[75] Inventor: Ryuichi Ohmura, Shizuoka, Japan

[73] Assignee: Fuji Kogyo Co., Ltd., Japan

[21] Appl. No.: 380,146

[22] Filed: May 20, 1982

[30] Foreign Application Priority Data

May 22, 1981 [JP] Japan .................... 56-75110[U]
Sep. 10, 1981 [JP] Japan .................... 56-135048[U]

[51] Int. Cl.$^3$ ........................................ A01K 87/06
[52] U.S. Cl. ............................................... 43/22
[58] Field of Search ............... 16/110 R; 24/255 SL; 43/22; 403/261, 259, 265, 278, 284, 285, 326, 341, 342; 285/382.2; 339/259 R

[56] References Cited

U.S. PATENT DOCUMENTS

| 814,020 | 3/1906 | Clifford | 16/110 R |
| 916,497 | 3/1909 | Simmons | 16/110 R |
| 1,678,640 | 7/1928 | Hall | 403/285 |
| 1,837,623 | 12/1931 | Mansfield | 43/22 |
| 2,592,878 | 4/1952 | Esposito | 43/22 |
| 3,713,622 | 1/1973 | Dinger | 24/255 SL |
| 3,745,514 | 7/1973 | Brishka | 339/259 X |
| 4,275,485 | 6/1981 | Hutchison | 24/255 SL |

FOREIGN PATENT DOCUMENTS 2017471 10/1979 United Kingdom ............. 43/22

*Primary Examiner*—Nicholas P. Godici
*Assistant Examiner*—M. Jordan
*Attorney, Agent, or Firm*—Cantor and Lessler

[57] ABSTRACT

A reel mount assembly of cylindrical structure includes a cylindrical body having a stationary sleeve mounted on one end and a slidable sleeve mounted on the other end having a male thread over a certain range, and a threaded annular member adapted to mate with the male thread. The slidable sleeve is engaged with the threaded annular member in such a manner that they are rotatable with each other. At the engagement position the annular member is fitted over the slidable sleeve, and vice versa. The outer member has a rigidity sufficient to prevent its expansion, and the inner member is contractive inwardly due to its resiliency.

3 Claims, 7 Drawing Figures

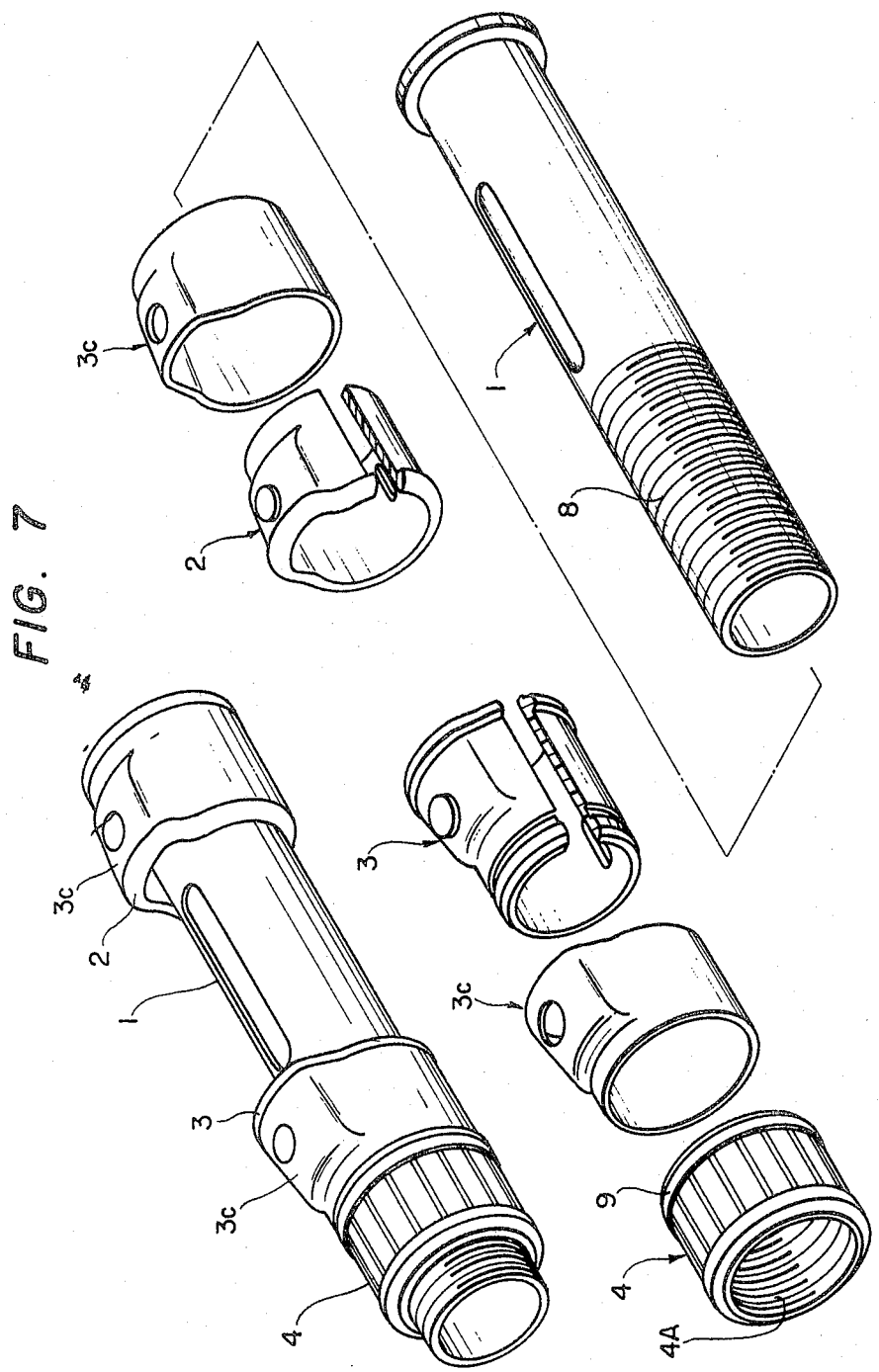

REEL MOUNT ASSEMBLY OF CYLINDRICAL STRUCTURE

BACKGROUND OF THE INVENTION

The present invention relates to a fishing reel mount assembly of cylindrical structure and more particularly to a junctional structure between a slidable sleeve provided for a fixation of a fishing reel leg and a threaded annular member provided for a slidable means of the slidable sleeve upon a cylindrical body.

One prior art example of such an arrangement is disclosed in U.S. Pat. App. Ser. No. 178,388 entitled "Structure of Coupling Slidable Sleeve with Threaded Annular Members in Fishing Reel Seat of Cylindrical Type."

According to a specification of the prior art, a threaded annular member is rotatably connected with a slidable sleeve in female-male relation and makes use of a resilient construction of the female portion for a press connection, however, such arrangement has a drawback that a junction of said two members may be disconnected while dismounting a fishing reel and especially when the slidable is sleeve tightly jam-fitted on a leg of a fishing reel, considerable disconecting force is exerted upon the junction, the female portion of which expands outwardly, resulting in disengagement.

SUMMARY OF THE INVENTION

It is therefore a main object of the present invention to provide a novel coupling structure of a slidable sleeve with a threaded annular member which is free from the disadvantage of the prior art.

According to the present invention, such an accidental detachment of a junction by limiting outward and inward expansion of female and male member of the coupling structure at the final assembling stage yet retaining a resilient nature of the members for press fitting is eliminated. From this point of view the present invention is accomplished by making a male coupling member resilient to fit into a female coupling member which cannot expand and further, the coupling members are slipped over a cylindrical body, this preventing inward expansion of the male member.

BRIEF DESCRIPTION OF THE DRAWINGS

This and other objects and features of the present invention will become apparent from a reading of the following detailed description with reference to the accompanying drawings, in which:

FIG. 7 is a perspective view, both assembled and exploded, of said assembly.

DETAILED DESCRIPTION OF THE INVENTION

Figure 1:
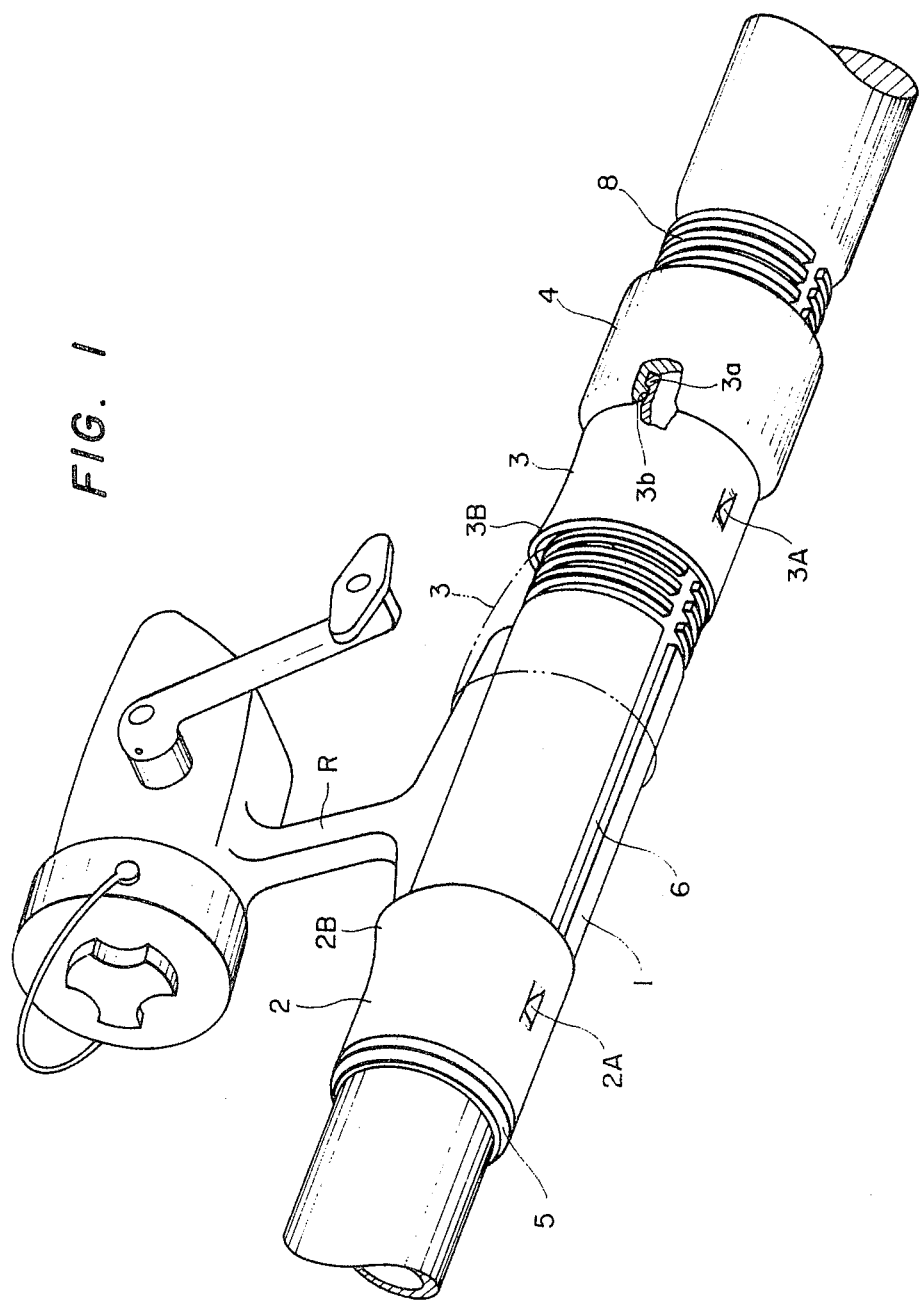
FIG. 1 is a perspective view showing the inventive reel mount assembly of cylindrical structure in use.
Figure 2:
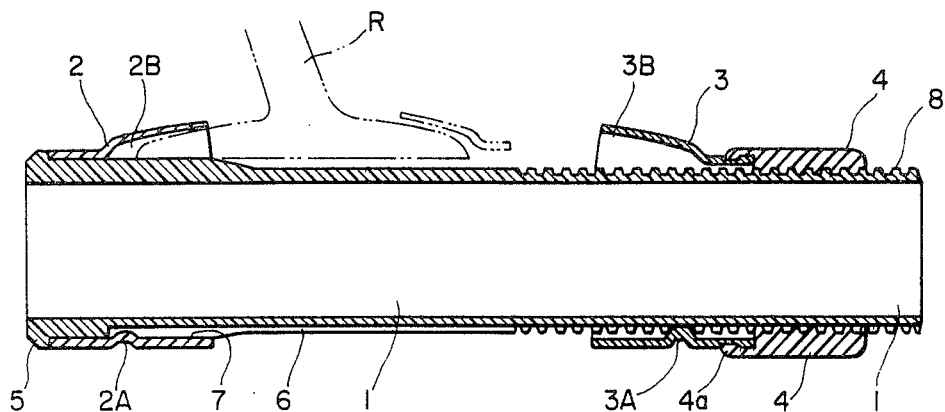
FIG. 2 is a central longitudinal section of FIG. 1.
Figure 3:
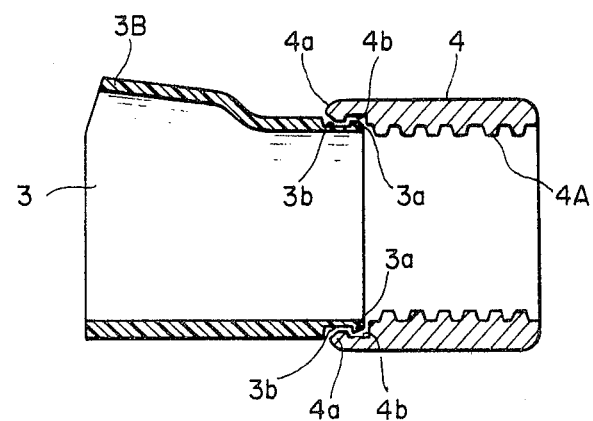
FIG. 3 is a longitudinal section showing one arrangement of the slidable sleeve and the threaded annular member on an enlarged scale.

Referring to FIG. 1 which is a perspective view of the inventive reel mount assembly of cylindrical structure in use, a cylindrical body 1 is provided, formed of a plastic material reinforced with, for instance, glass fibers. This body has a stationary sleeve 2 fitted over one end and a slidable sleeve 3 mounted on the other (opposite) end. The sleeve 3 is rotatably engaged with a threaded annular member 4. The cylindrical body 1 has a flange 5 at its foremost front end and a key groove 6 running from one end to the other end. A portion, shown at 7, of the body in the vicinity of flange 5 is of a slightly larger diameter, and serves to receive the stationary sleeve 2 thereover. The said other end of the cylindrical body is provided with a male thread 8 over a certain range. The stationary sleeve 2 is fitted over the portion 7 in the following manner. The stationary sleeve 2 is first inserted from the threaded (8) end over the cylindrical body 1. This insertion of the sleeve 2 is relatively easy until it reaches the portion 7, because there is a slight difference between the inner diameter of the stationary sleeve 2 and the outer diameter of the cylindrical body. The stationary sleeve is then press-fitted over the portion 7 of a slightly larger diameter. In this insertion operation, the location of a hood 2B forming part of the stationary sleeve 2 is effected by an engaging lug 2A thereof to be fitted into the key groove 6.

The slidable sleeve includes an engaging lug 3A on its bottom side and a hood 3B on the opposite side. The annular member to be engaged with the sleeve 3 has a female thread 4A on its inside face.

The engagement of the slidable sleeve with the threaded annular member will now be explained. It is here noted that the slidable sleeve may be fitted over the threaded annular member, and vice versa. As an example, the present invention will be explained in connection with one embodiment where the threaded annular member is positioned over the slidable sleeve.

Referring to FIGS. 1 to 4 inclusive, the threaded annular member 4 is formed of a metal material, and has sufficient rigidity. The slidable sleeve 3 is, on the other hand, formed of a flexible plastic material. Where the slidable sleeve is made of a plastic material in its entirety, it may be provided with a reinforcing metallic hood frame 3C on its part e.g., the hood 3B for receiving the legs of a reel. This arrangement has the advantage that stamping may be disposed of, since the engaging lug 3A may be formed in an integral manner.

Figure 4:
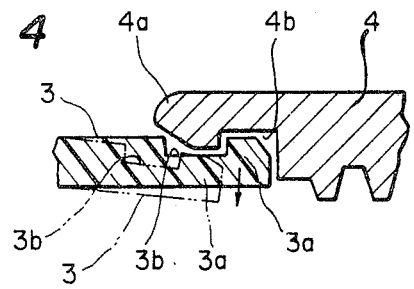
FIG. 4 is a longitudinal section showing one engagement of said sleeve with said member on a further enlarged scale.

As shown in FIG. 4 on an enlarged scale, the slidable sleeve 3 has an engaging peripheral edge 3a at its rear end and an engaging groove 3b positioned adjacent thereto. On the other hand, the threaded annular member 4 has a peripheral edge 4a to be engaged with the groove 3b and a groove 4b to be engaged with the edge 3a.

In assembling, the slidable sleeve is fitted into the threaded annular member, making use of the properties of the plastic material forming the slidable sleeve that it deforms elastically and inwardly. It is here noted that the dimension of the edges 3a, 4a and the grooves 3b, 4b are determined in such a manner that the sleeve 3 and the threaded annular member 4 are rotatable with each other after assembling.

The principle of the present invention is to prevent deformation such as outward expansion of the threaded annular member (or the slidable member) fitted over the slidable sleeve (or the threaded annular member). Accordingly, it is not essential in the present invention to form the outer member of a metal material so as to prevent outward expansion of the outer member.

Figure 5:
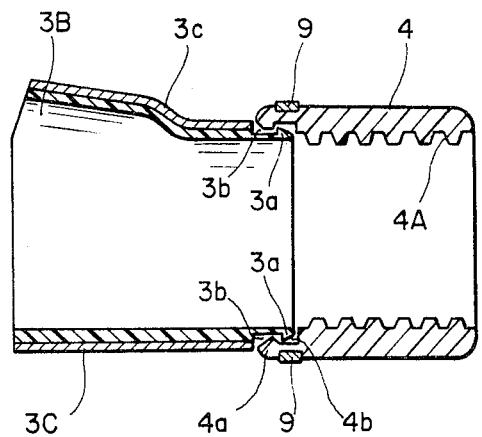
FIG. 5 is a longitudinal section showing another arrangement of the slidable sleeve and the threaded annular member.
Figure 6:
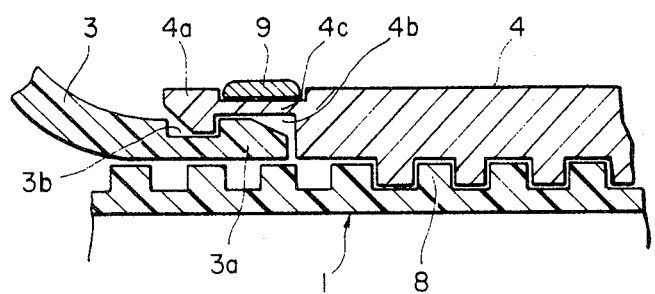
FIG. 6 is a longitudinal section showing the engagement of said sleeve with said member of a further enlarged scale.

This will be explained with reference to another embodiment illustrated in FIGS. 5 and 6. In this embodiment, the threaded annular member to be fitted over the slidable sleeve is formed of a plastic material, and surrounded with a metal ring 9 at a portion where members are engaged with each other. This portion is provided with an annular groove 4c into which the ring 9 is fitted.

In assembling, the metal ring 9 is first press-fitted into the annular groove 4c, making use of the properties of the plastics threaded annular member that it is deformable inwardly. Thereafter, the slidable sleeve abuts against the threaded annular member in the same manner as in the foregoing embodiment, and is forcibly inserted thereinto, making use of its inwardly elastic deformation. In this embodiment, the metal hood frame 3C is fitted over the slidable sleeve prior to the press-fit engagement of the slidable sleeve with the threaded annular member, since the slidable sleeve has its body formed of plastics, and the metal hood frame 3C therearound.

With the invention arrangement as mentioned above, it is possible to eliminate an accidental detachment of one member (e.g., the slidable sleeve 3) out of the other member (e.g., the threaded annular member 4) fitted thereover due to expansion of the other member or contraction of the one member, since the one member abuts against the outer periphery of the cylindrical body and is not allowed to deform inwardly, while the other member is not permitted to deform outwardly. It is understood that difficulties are encountered in deforming said one member, if it is formed of a metal material; however, said one member may be formed of a metal member; provided that it has a slit or slits so as to undergo deformation.

In assembling, said one member is press-fitted in place due to its easy contraction and deformation with no difficulty. In the embodiment of FIGS. 5 and 6, the metal ring is easily fitted into the annular groove on the threaded annular member since the latter member deforms inwardly. After the metal ring has been fitted over the annular member, no inward deformation of the annular member takes place due to the presence of the slidable sleeve and the cylindrical body. This, together with the presence of the annular groove, prevents an accidental detachment of the metal ring.

What is claimed:

1. In a reel mount assembly of cylindrical structure comprising a cylindrical body having a male thread over a predetermined range, a stationary sleeve mounted on one end and a slidable sleeve member slidingly mounted on the other end, a threaded annular member adapted to mate with said male thread, said slidable sleeve member and said annular member being rotatably coupled to each other in a male-female manner, said slidable sleeve member being slid by turning said annular member, the improvement comprising both said slidable sleeve member and said threaded annular member being formed of a plastic material, and a metal ring being fitted over the outermost of said members where said members overlap to provide a rigidity sufficient to prevent its outward expansion and the other of said members being resiliently fitted into said outermost member, whereby accidental disconnection of said members is prevented.

2. A reel mount assembly as recited in claim 1, in which said outer member is said slidable sleeve member.

3. A reel mount assembly as recited in claim 1, in which said outer member is said threaded annular member.

* * * * *